United States Patent
Pabst et al.

(10) Patent No.: US 7,808,149 B2
(45) Date of Patent: Oct. 5, 2010

(54) GENERATOR/ELECTRIC MOTOR, IN PARTICULAR FOR WIND POWER PLANTS, CABLE CONTROLLED PLANTS OR FOR HYDRAULIC PLANTS

(75) Inventors: Otto Pabst, Rio Di Pusteria (IT); Michael Kleinlercher, Steinach (AT)

(73) Assignee: Wilic S.AR.L., Luxembourg (LU)

( * ) Notice: Subject to any disclaimer, the term of this patent is extended or adjusted under 35 U.S.C. 154(b) by 208 days.

(21) Appl. No.: 11/663,366

(22) PCT Filed: Sep. 16, 2005

(86) PCT No.: PCT/IB2005/002742

§ 371 (c)(1),
(2), (4) Date: Nov. 29, 2007

(87) PCT Pub. No.: WO2006/032969

PCT Pub. Date: Mar. 30, 2006

(65) Prior Publication Data

US 2008/0309189 A1   Dec. 18, 2008

(30) Foreign Application Priority Data

Sep. 20, 2004   (IT)   .......................... BZ2004A0047

(51) Int. Cl.
*H02K 1/18*   (2006.01)
*H02K 1/00*   (2006.01)

(52) U.S. Cl. ..................... 310/216.086; 310/216.088; 310/216.089; 310/216.074; 310/216.079; 310/216.078

(58) Field of Classification Search ................................
310/156.01–156.84, 216–218, 261, 112–114,
310/216.088, 216.089, 216.007, 216.008,
310/216.086, 216.074, 216.079, 216.078,
310/216.051, 216.049, 266
See application file for complete search history.

(56) References Cited

U.S. PATENT DOCUMENTS 1,672,013 A   6/1928   Vroom (Continued)

FOREIGN PATENT DOCUMENTS

CA   2 404 939   4/2004

(Continued)

OTHER PUBLICATIONS

Maxime Dubois, Study of TFPM machines with toothed rotor applied to direct-drive generators for wind turbines, 2004.

*Primary Examiner*—Quyen Leung
*Assistant Examiner*—Leda Pham
(74) *Attorney, Agent, or Firm*—K&L Gates LLP

(57) ABSTRACT

A segmented electric generator/motor, such as for a wind powered generator, in which the rotor and/or stator is subdivided in the circumferential direction into segments disposed adjacent to one another. Additionally, the stator segments are accessible via and the rotor segments can be installed and removed in the axial direction in rotor segment mounts provided in the rotor ring. Each rotor segment preferably includes a base shaped to prevent radial and circumferential or tangential motion of the rotor segment while permitting axial motion in the rotor segment's respective mount. The rotor ring segment mounts are preferably sized to allow removal of stator segments through the openings.

15 Claims, 2 Drawing Sheets

U.S. PATENT DOCUMENTS

| | | |
|---|---|---|
| 1,894,357 A | 1/1933 | Manikowske et al. |
| 2,006,172 A | 6/1935 | Klappauf |
| 2,040,218 A | 5/1936 | Soderberg |
| 2,177,801 A | 10/1939 | Arnold |
| 3,221,195 A | 11/1965 | Hoffmann |
| 3,748,089 A | 7/1973 | Boyer et al. |
| 3,789,252 A | 1/1974 | Abegg |
| 4,087,698 A | 5/1978 | Myers |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,350,897 A | 9/1982 | Benoit |
| 4,490,093 A | 12/1984 | Chertok et al. |
| 4,517,484 A | 5/1985 | Dacier |
| 4,720,640 A | 1/1988 | Anderson et al. |
| 4,761,590 A | 8/1988 | Kaszman |
| 4,900,965 A | 2/1990 | Fisher |
| 4,906,060 A | 3/1990 | Claude |
| 5,004,944 A | 4/1991 | Fisher |
| 5,090,711 A | 2/1992 | Becker |
| 5,091,668 A * | 2/1992 | Cuenot et al. .......... 310/156.61 |
| 5,281,094 A | 1/1994 | McCarty et al. |
| 5,311,092 A | 5/1994 | Fisher |
| 5,315,159 A | 5/1994 | Gribnau |
| 5,663,600 A | 9/1997 | Baek et al. |
| 5,696,419 A | 12/1997 | Rakestraw et al. |
| 5,783,894 A | 7/1998 | Wither |
| 5,844,341 A | 12/1998 | Spooner et al. |
| 5,986,374 A * | 11/1999 | Kawakami ............. 310/156.13 |
| 5,986,378 A | 11/1999 | Caamaño |
| 6,093,984 A * | 7/2000 | Shiga et al. ................... 310/26 |
| 6,278,197 B1 | 8/2001 | Appa |
| 6,285,090 B1 | 9/2001 | Brutsaert et al. |
| 6,373,160 B1 | 4/2002 | Schrödl |
| 6,417,578 B1 | 7/2002 | Chapman et al. |
| 6,452,287 B1 | 9/2002 | Looker |
| 6,455,976 B1 | 9/2002 | Nakano |
| 6,483,199 B2 | 11/2002 | Umemoto et al. |
| 6,504,260 B1 | 1/2003 | Debleser |
| 6,590,312 B1 | 7/2003 | Seguchi et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,828,710 B1 | 12/2004 | Gabrys |
| 6,888,262 B2 | 5/2005 | Blakemore |
| 6,891,299 B2 * | 5/2005 | Coupart et al. ......... 310/156.55 |
| 6,921,243 B2 | 7/2005 | Canini et al. |
| 6,933,646 B2 | 8/2005 | Kinoshita |
| 6,951,443 B1 | 10/2005 | Blakemore |
| 6,972,498 B2 | 12/2005 | Jamieson et al. |
| 7,004,724 B2 | 2/2006 | Pierce et al. |
| 7,008,348 B2 | 3/2006 | LaBath |
| 7,021,905 B2 | 4/2006 | Torrey et al. |
| 7,042,109 B2 | 5/2006 | Gabrys |
| 7,075,192 B2 | 7/2006 | Bywaters et al. |
| 7,081,696 B2 | 7/2006 | Ritchey |
| 7,098,552 B2 | 8/2006 | McCoin |
| 7,109,600 B1 | 9/2006 | Bywaters et al. |
| 7,116,006 B2 | 10/2006 | McCoin |
| 7,205,678 B2 | 4/2007 | Casazza et al. |
| 7,385,305 B2 | 6/2008 | Casazza et al. |
| 7,385,306 B2 | 6/2008 | Casazza et al. |
| 2002/0089251 A1 * | 7/2002 | Tajima et al. ............... 310/216 |
| 2003/0102677 A1 | 6/2003 | Becker et al. |
| 2003/0137149 A1 | 7/2003 | Northrup et al. |
| 2004/0150283 A1 | 8/2004 | Calfo et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0082839 A1 | 4/2005 | McCoin |
| 2005/0280264 A1 | 12/2005 | Nagy |
| 2006/0001269 A1 | 1/2006 | Jansen et al. |
| 2006/0125243 A1 | 6/2006 | Miller |
| 2006/0131985 A1 | 6/2006 | Qu et al. |
| 2006/0152015 A1 | 7/2006 | Bywaters et al. |
| 2006/0152016 A1 | 7/2006 | Bywaters et al. |
| 2007/0187954 A1 | 8/2007 | Struve et al. |
| 2008/0315594 A1 | 12/2008 | Casazza et al. |

FOREIGN PATENT DOCUMENTS

| | | |
|---|---|---|
| DE | 1 130 913 | 6/1962 |
| DE | 2 322 458 | 5/1973 |
| DE | 3844505 | 7/1990 |
| DE | 44 02 184 | 8/1995 |
| DE | 196 52 673 | 6/1998 |
| DE | 102 19 190 | 11/2003 |
| DE | 10 2004 028 746 | 12/2005 |
| EP | 0 313 392 | 4/1989 |
| EP | 0 627 805 | 12/1994 |
| EP | 1 167 754 | 1/2002 |
| EP | 1 289 097 | 3/2003 |
| EP | 1 291 521 | 3/2003 |
| EP | 1 363 019 | 11/2003 |
| EP | 1 375 913 | 1/2004 |
| EP | 1 394 406 | 3/2004 |
| EP | 1 589 222 | 10/2005 |
| EP | 1 772 624 | 4/2007 |
| FR | 859 844 | 12/1940 |
| FR | 2 519 483 | 12/1981 |
| FR | 2 810 374 | 12/2001 |
| GB | 1913 17 268 | 3/1914 |
| GB | 859 176 | 1/1961 |
| GB | 2 050 525 | 1/1981 |
| GB | 2 131 630 | 6/1984 |
| GB | 2 266 937 | 11/1993 |
| GB | 2 372 783 | 9/2002 |
| JP | 57-059462 | 4/1982 |
| RU | 2 000 466 | 4/1991 |
| WO | WO 84/02382 | 6/1984 |
| WO | 92/12343 | 7/1992 |
| WO | WO 00/01056 | 1/2000 |
| WO | 01/06623 | 1/2001 |
| WO | 01/21956 | 3/2001 |
| WO | 01/35517 | 5/2001 |
| WO | 01/69754 | 9/2001 |
| WO | 02/33254 | 4/2002 |
| WO | WO 02/057624 | 7/2002 |
| WO | 03/067081 | 8/2003 |
| WO | WO 2004/017497 A1 | 2/2004 |
| WO | WO 2008/116463 | 10/2008 |

* cited by examiner

GENERATOR/ELECTRIC MOTOR, IN PARTICULAR FOR WIND POWER PLANTS, CABLE CONTROLLED PLANTS OR FOR HYDRAULIC PLANTS

BACKGROUND AND SUMMARY

The present invention relates to a rotating machine, such as a generator or an electric motor for wind power plant, and traction cable plant. The rotating machine generally comprises a bearing, an annular stator supporting the bearing, an annular, turnable rotor facing the stator and supported by the bearing, and, connected to the rotor, a drive arrangement. In embodiments employed as electrical generators or motors, one of the stator or rotor will carry permanent magnets or other magnetic field generators, while the other of the stator and the rotor will carry windings, the magnetic field generators and the windings being disposed on opposing surfaces of the stator and of the rotor.

Preferred embodiments are particularly suited for wind powered machines, such as large scale electrical generators, and the drive arrangement in such embodiments includes blades mounted on a hub attached to the rotor so that the rotor rotates when wind passes over the blades. Large scale wind powered electrical generators are becoming more common, particularly in onshore and offshore wind farm applications. In such large scale generators, a tower supports a nacelle housing the stator, which supports the rotor, which supports the drive arrangement, such as a hub and blades. Equipment required for controlling the generator, including controls for the blades and other machinery, can be housed in the tower, the nacelle, and/or in cavities within the stator and/or the rotor. Embodiments preferably are particularly suited for use in an annular variety of such rotating machines in which an annular stator faces an annular rotor. Preferably, the rotor rotates within the stator and carries the magnetic field generators, such as permanent magnets, on an external surface of the rotor. The windings or coils are carried on an inner surface of the stator facing the rotor. It should be clear that the rotor could rotate outside the stator and/or the magnetic field generators could be carried on the stator. The machines are sized and arranged to enable human passage into the interior of the rotor.

In rotating machines of this type, particularly the annular variety, a problem arises in that the magnetic field generators, such as permanent magnets, as well as the windings, are difficult to maintain and repair. In the preferred annular arrangement in which the rotor rotates within the stator, access to the stator elements is blocked from inside the machine by the rotor. In most cases the rotating machine components must be entirely removed or disassembled in order to obtain access to the point of a fault or to get access to a part to be maintained. It is sometimes necessary to remove virtually the complete stator or rotor in order to bring a component to the workshop and to repair or maintain it. This can be quite cumbersome since the parts involved can be quite heavy and difficult to manage and/or transport when they are atop a fifteen meter high or taller support tower.

A generator is described in the international patent application WO 2004/017497 A1 where simple mounting and dismounting of individual generator components is possible. In this case, however, only one particular arrangement of annular windings and the same armature is provided, which are disposed so as to be sequential. That is, the generator is constructed with an axial arrangement of axially-alternating rotors and stators. The rotors and stators are of similar radial dimension and are broken into segments. However, because of the axial arrangement of the components, the issue of access to the annular stator surrounding an annular rotor, or vice versa, is not addressed.

Another generator is disclosed in U.S. Pat. No. 5,844,341 to Spooner et al. Spooner et al. employ a modular rotor comprising concentric, axially spaced rotor rings mounted on a shaft with spokes. Pairs of the axially-spaced rotor rings support magnet modules that can be installed and removed in a radial direction, the modules being attached to the rings with bolts extending axially through the rings into radially and circumferentially extending mounting plates. While Spooner et al. employ a modular rotor, they do so in a spoked wheel type generator that does not encounter the issues an annular generator has regarding mounting of the rotor segments and access to the stator components. The Spooner et al. solution can not be employed in an annular generator since the rotor segments are supported only at their ends, which would be insufficient in an annular generator.

Embodiments disclosed herein provide a circumferentially segmented rotating machine, such as an annular wind powered generator, in order to be able to mount, repair, and maintain the rotating device in a simpler manner by providing easy access to components of the rotating machine. Embodiments achieve easy access to the components of the rotor and stator by providing a circumferentially segmented rotor and a circumferentially segmented stator. The stator segments are attached to the stator/housing with bolts extending radially to the exterior of the stator and are disposed so that the stator segments are adjacent to one another. The rotor segments are preferably mounted in an annular rotor ring via openings in the rotor ring. A base preferably allows easy axial removal of each rotor segment by engaging axially-extending edges of a respective axial mounting slot formed in the rotor ring to extend from one edge of the rotor ring axially into the ring. Like the stator segments, the rotor segments are disposed so as to be adjacent to one another. When a rotor segment is removed by sliding it out of the rotor ring in an axial direction, one or more stator segments can be accessed through the exposed opening of the empty mounting slot. If the mounting slots, rotor segments, and stator segments are sized properly, then the stator segments can be removed through the openings of the mounting slots, such as in a substantially radial direction.

In a preferred embodiment, each rotor segment comprises at least one permanent magnet and each stator segment has at least one winding. Each rotor segment preferably is disposed on a base which is provided with a profile shaped to prevent radial and circumferential motion of the segment while allowing axial movement of the segment. For example, a dovetail-shaped profile which engages the edges of the mounting slot in the rotor ring with grooves in sides of the profile can be employed. Thus, each rotor segment can be removed in the axial direction without the entire rotor having to be removed. It should again be noted that, while embodiments are described with the rotor carrying magnets and the stator carrying windings or coils, the stator could instead carry magnets while the rotor could instead carry windings or coils.

BRIEF DESCRIPTION OF THE DRAWINGS

Further characteristics and advantages of the segmented rotating machine according to the invention follow from the claims and from the following description of a preferred form of embodiment represented in the accompanying drawings. Shown are:

DESCRIPTION

Figure 1:
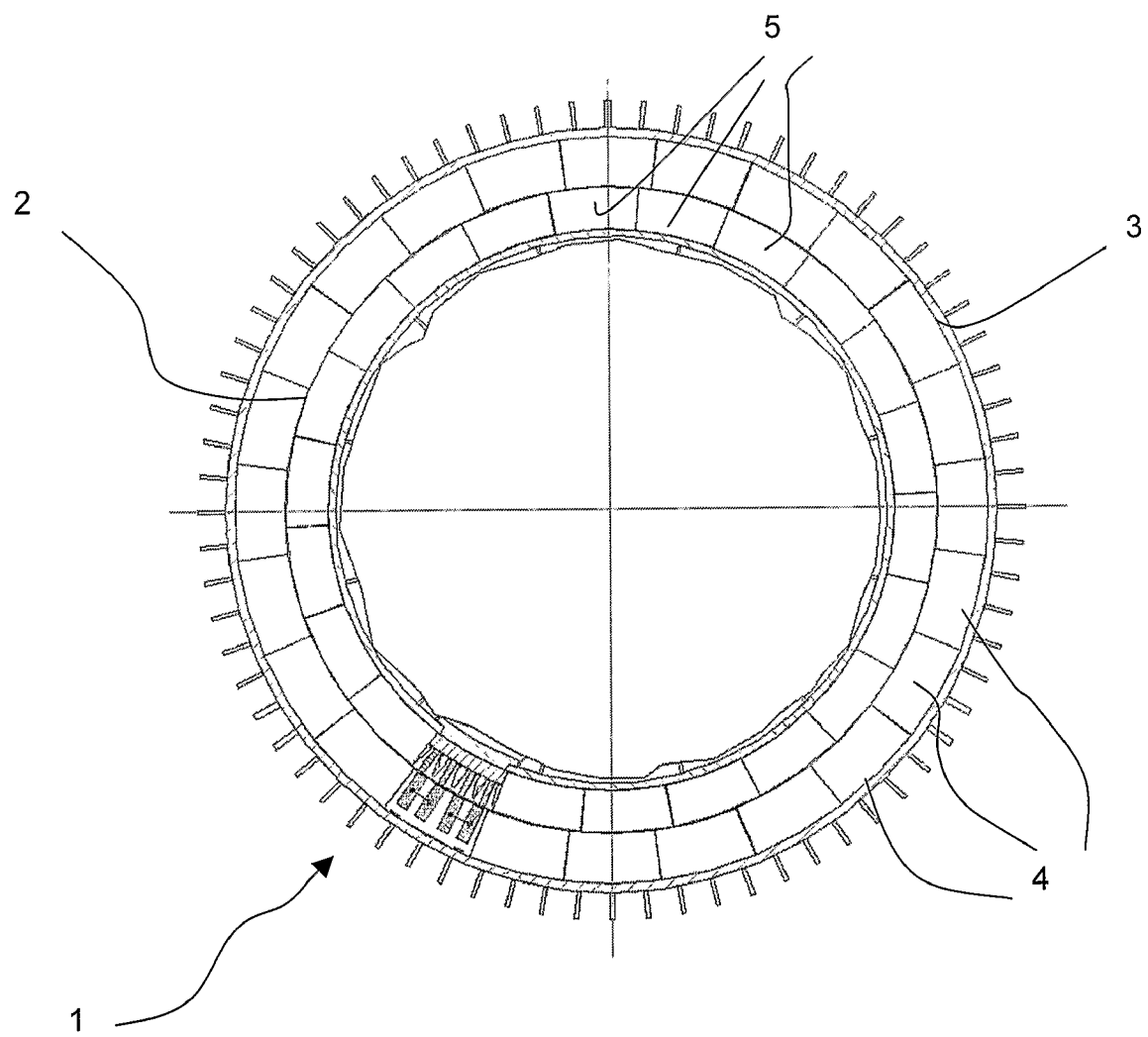
FIG. 1, a view in the axial direction of a rotating machine, such as a generator/electric motor, according to embodiments, in particular for wind power mechanisms, winch cable mechanisms and/or hydraulic mechanisms, and FIG. 2, a schematic, enlarged detail from FIG. 1.

As shown in the figures, a rotating machine according to the invention, such as a wind powered generator, is represented with the reference number 1. The rotating machine 1 comprises a stator 3 and a rotor 2. The stator 3 is subdivided into a plurality of circumferential stator segments 4, while the rotor 2 is subdivided into a plurality of circumferential rotor segments 5 that are preferably larger than the stator segments 4. Where the rotating machine 1 embodiments is a generator or electric motor, each stator segment 4 can comprise at least one winding 6. In the present preferred case, two tooth-wound coil windings are shown, though other numbers and types of windings can be employed within the scope of embodiments. Again, where the rotating machine 1 embodiments is a generator or electric motor, the rotor segments 5 preferably carry magnetic field generators 7, preferably in the form of permanent magnets.

Figure 2:
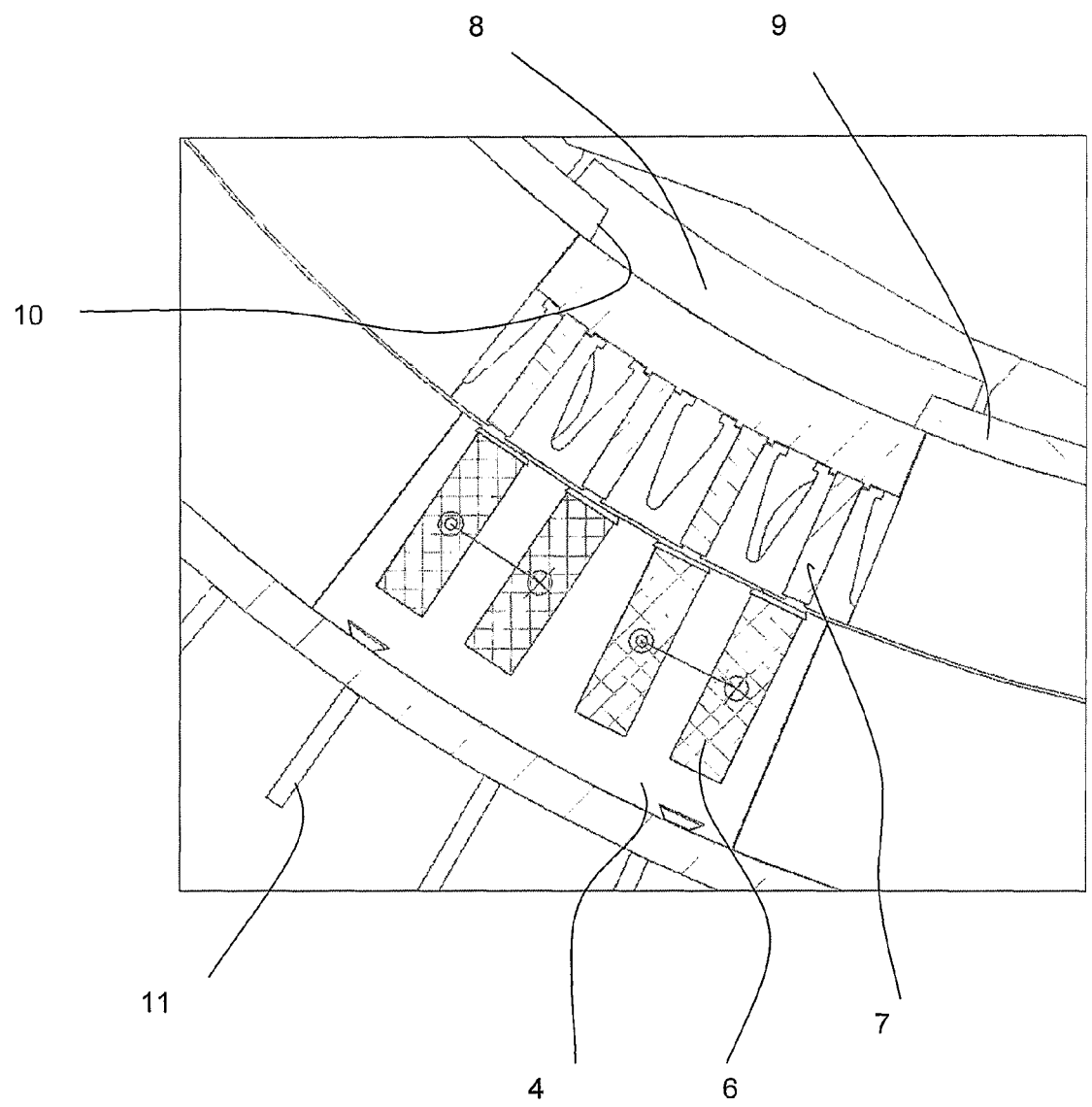

According to embodiments, each rotor segment 5 carries at least one magnetic field generator 7, such as a permanent magnet. In the present case shown in the FIGS., four permanent magnets, are preferably disposed on each segment 5, but different numbers of magnets 7 could be employed within the scope of embodiments. Preferably, the rotor segment 5 includes a base 8 which is mounted in a rotor ring 9 of the rotor 2 via a rotor segment mount 10 in the form of a slot, window, or opening, which extends in an axial direction along the rotor ring 9. More particularly, the mount 10 preferably includes axially extending, circumferentially spaced apart side walls between an end of the rotor ring and a circumferentially extending end wall of the segment mount. The base 8 is shaped to allow axial movement of the base 8 in the mount 10, but to restrain the base 8 against circumferential and radial movement. For example, the base 8 can have a dovetail shaped profile in which the edges of the base 8 include grooves that have inclined surfaces, as seen in FIG. 2. Preferably, in embodiments the mount 10, and the corresponding base 8 and rotor segment 5, is sized in such a manner that a stator segment 4 can be removed at the face when a rotor segment 5 is not present in the mount 10. In other words, when maintenance of a stator segment 4 is required, one or more rotor segments 5 in the vicinity of the stator segment 4 is removed by sliding it axially in the mount 10 to provide access to the stator segment 4 via the opening left in the mount 10. If the stator segment 4 must be removed, then it can be removed in a substantially radial direction (at the face) through the opening left in the mount 10 once the stator segment's restraints have been released.

In an expedient manner, the outer face of the wind powered generator of embodiments is provided with cooling ribs or fins 11. The stator segments 4 are preferably restrained or mounted with bolts projecting into the stator 2 from the outer face of the rotating machine 1 and into or through the stator segments 4, or vice versa. Preferably, the bolts are placed between cooling ribs or fins 11 so as not to interfere with the ribs or fins 11.

It will be appreciated that various of the above-disclosed and other features and functions, or alternatives thereof, may be desirably combined into many other different systems or applications. It will also be noted that various presently unforeseen or unanticipated alternatives, modifications, variations or improvements therein may be subsequently made by those skilled in the art which are also intended to be encompassed by the following claims.

What is claimed is:

1. A wind power plant or a traction cable plant electric generator/motor comprising:
   an annular stator;
   an annular hollow rotor facing the stator and configured to rotate with respect to the stator; and
   a plurality of respective generator elements, each generator element comprising at least one permanent magnet and at least one winding, said generator elements disposed on respective opposing faces of the stator and of the rotor;
   the annular hollow rotor being subdivided in the circumferential direction into a plurality of rotor segments disposed adjacent to one another, each of the rotor segments configured to move in the axial direction to facilitate installation of the generator element of said rotor segment, removal of the generator element of said rotor segment, and maintenance of the generator element of the rotor segments and to provide access to at least one component mounted on the stator.

2. The electric generator/motor of claim 1 wherein the annular hollow rotor further comprises a rotor ring in which the rotor segments are mounted.

3. The electric generator/motor of claim 2 wherein the rotor ring comprises a rotor segment mount for each rotor segment, the mount comprising a plurality of circumferentially spaced apart edges extending axially from an end of the rotor ring to an end wall of the mount.

4. The electric generator/motor of claim 3 wherein each rotor segment has a base shaped to: (i) restrain the rotor segment against circumferential and radial movement and (ii) enable axial movement of the rotor segment.

5. The electric generator/motor of claim 3 wherein the annular stator comprises a plurality of circumferential stator segments sized to fit through the rotor segment mounts when a respective rotor segment is axially moved out of its mount in the rotor ring.

6. A wind power plant or a traction cable plant segmented electric generator/motor comprising:
   an annular hollow rotor carrying a first group of generator elements, the generator elements comprising one of at least one magnetic field generator and at least one winding; and
   an annular stator carrying a second group of generator elements facing the first group of generator elements;
   the annular hollow rotor including a rotor ring and a plurality of circumferential rotor segments, each rotor segment carrying at least one of the generator elements of the first group of generator elements, the rotor segments being mounted adjacent one another on the rotor ring, wherein the rotor ring comprises a segment mount for each rotor segment, the segment mount including a plurality of axially extending circumferentially spaced apart side walls between an end of the rotor ring and a circumferentially extending end wall of the segment mount, the segment mount configured to allow axial installation and removal of a respective rotor segment.

7. The segmented electric generator/motor of claim 6 wherein the rotor is mounted within the stator and the rotor segment mounts provide access to the second group of generator elements carried on the stator when respective rotor segments are absent.

8. A wind power plant or a traction cable plant segmented electric generator/motor comprising:

an annular hollow rotor carrying a first group of generator elements, the generator elements comprising one of at least one magnetic field generator and at least one winding; and an annular stator carrying a second group of generator elements facing the first group of generator elements;

the annular hollow rotor including a rotor ring and a plurality of circumferential rotor segments, each rotor segment carrying at least one of the generator elements of the first group of generator elements, the rotor segments being mounted adjacent one another on the rotor ring, wherein each rotor segment further comprises a base configured to engage a respective segment mount in the rotor ring to prevent radial and tangential movement of the rotor segment and permit axial movement of the rotor segment.

9. The segmented electric generator/motor of claim 8 wherein the base comprises grooves on a plurality of sides thereof which correspond to the edges of the segment mount.

10. A wind power plant or a traction cable segmented electric generator/motor comprising:

a plurality of circumferential segments each carrying at least one first generator element;

one of an annular stator and an annular hollow rotor including a ring configured to support the plurality of circumferential segments;

a plurality of second generator elements on the other of the annular stator and the annular hollow rotor, said second generator elements arranged to face the first generator elements; and a plurality of segment mounts in the ring, each segment mount supporting a respective one of the circumferential segments.

11. The segmented electric generator/motor of claim 10 wherein the rotor is mounted within the stator and the ring is a rotor ring.

12. The segmented electric generator/motor of claim 10 comprising another plurality of circumferential segments each carrying at least one of the second generator elements.

13. The segmented electric generator/motor of claim 10 wherein the stator is mounted within the rotor and the ring is a stator ring.

14. The segmented electric generator/motor of claim 10 wherein the ring is part of an inner surface of the rotor and the stator so that removal of a circumferential segment provides access to an inner surface of the outer of the rotor and the stator.

15. The segmented electric generator/motor of claim 14 wherein the outer of the rotor and the stator comprises another plurality of circumferential segments that are each configured to be removed through a segment mount of the ring when a respective segment of the inner of the rotor and the stator is absent from its mount.

* * * * *